Jan. 23, 1951        N. J. DAVIS        2,539,231
FRAMING CANT HOOK
Filed Oct. 24, 1947        2 Sheets-Sheet 1
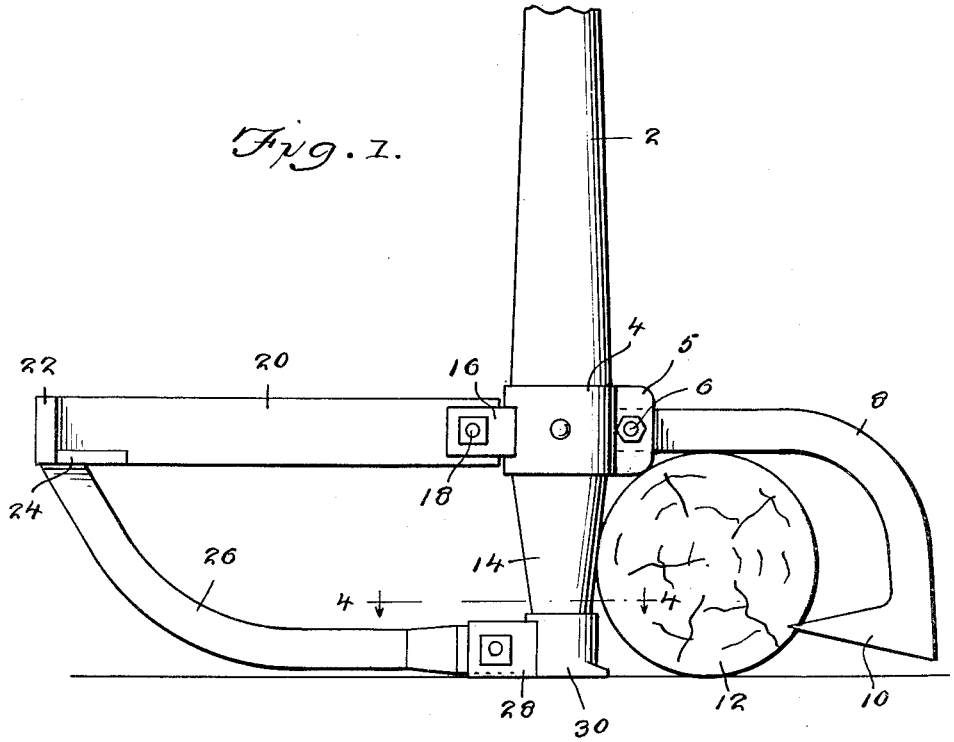
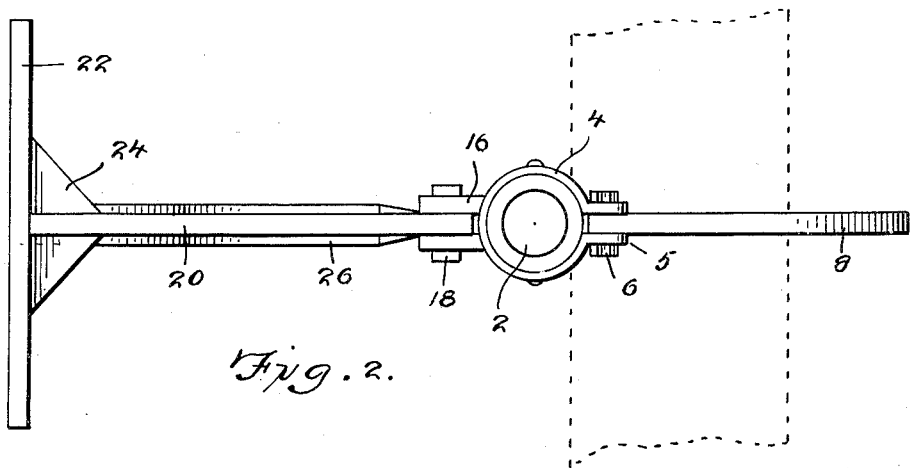
INVENTOR.
Norton J. Davis
BY Victor J. Evans & Co.
ATTORNEYS Jan. 23, 1951 N. J. DAVIS 2,539,231
FRAMING CANT HOOK
Filed Oct. 24, 1947 2 Sheets-Sheet 2
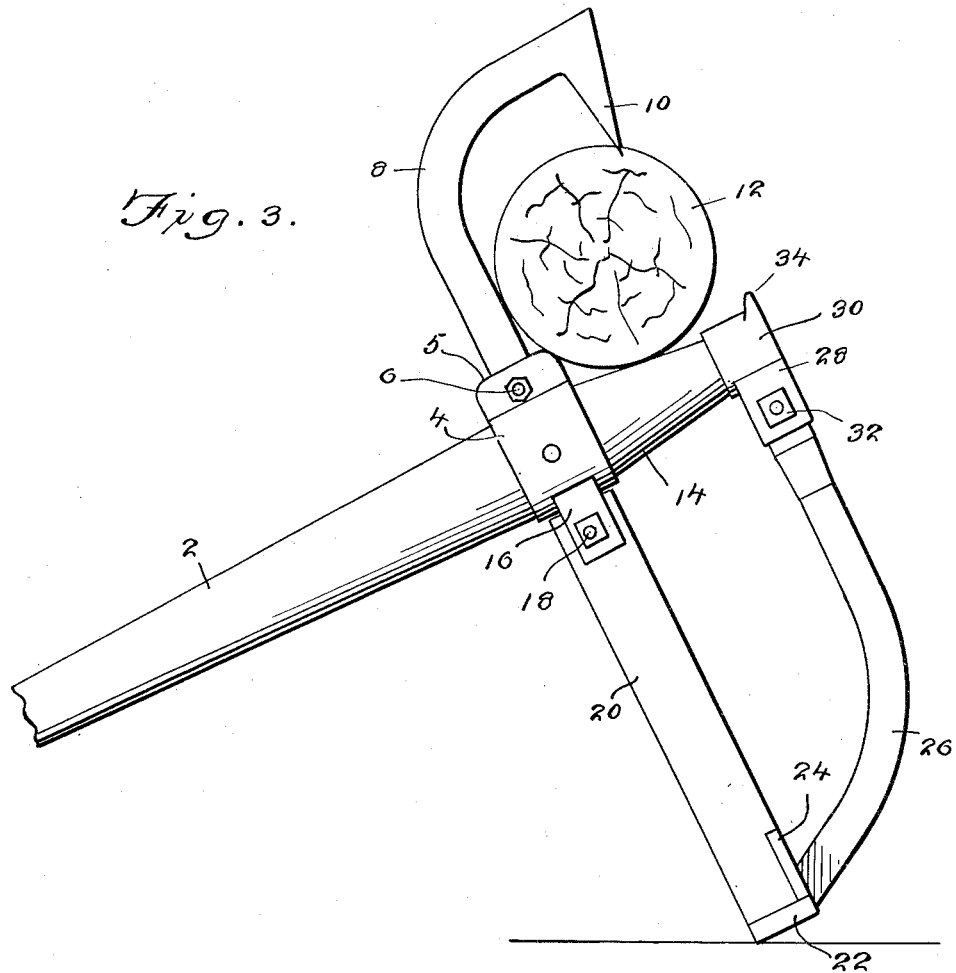
Fig. 3.
Fig. 4.
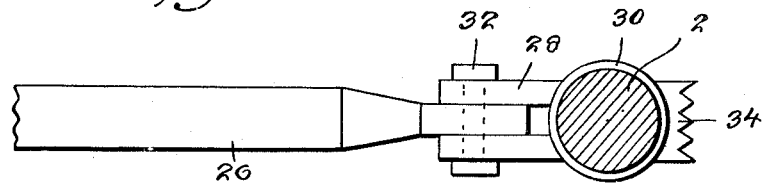
INVENTOR.
Norton J. Davis
BY Victor J. Evans & Co.
ATTORNEYS Patented Jan. 23, 1951

2,539,231

UNITED STATES PATENT OFFICE 2,539,231

FRAMING CANT HOOK

Norton J. Davis, Springer, N. Mex.

Application October 24, 1947, Serial No. 781,942

2 Claims. (Cl. 254—131)

My present invention relates to an improved cant hook of the type conventionally used to work logs or poles and having secured thereon an elevating structure so that the hooked log or pole may be raised and supported in position for framing without lifting.

Generally the improvement of my invention includes a rocker on the hook handle and a rigid supporting bar onto which the hooked log or pole is rolled.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Fig. 1 is a side elevational view of the device with the log or pole hooked.

Fig. 2 is a top plan view thereof.

Fig. 3 is a side elevational view similar to Fig. 1 but with the log elevated.

Fig. 4 is a sectional view at line 4—4 of Fig. 1.

Referring now to the drawings I have shown the present preferred embodiment of my invention as including the handle 2 to which the collar 4 having ears 5 is clamped by bolt 6, and the hook 8 is pivotally mounted on the bolt so that the tooth 10 may engage the log 12 to clamp the log between the hook and the tapered end 14 of the handle.

To the collar 4 I provide a pair of spaced lugs 16 to which is secured by bolt 18 the brace or arm 20 at right angles to the longitudinal axis of the handle and aligned with the hook when in operative position.

A cross arm 22 on the end of the arm 20 is braced by body members at 24 and a curved rocker 26 is secured to the junction of the arms, and is secured in the ears 28 of the collar 30 by bolt 32 on the tapered end 14 of the handle. The teeth 34 on the collar or sleeve 30 facilitate the grip of the device.

Thus the log on the ground or floor is engaged in conventional fashion by the pivoted hook and the handle may be swung or rocked to the left in Fig. 1 so that the rocker curves into ground engagement and the log is elevated until it is supported by the arm 20 and the cross arm 22. Further movement of the handle in the same direction until the upper end of the handle engages the ground as in Fig. 3 will provide two point support for the log.

The device of my invention will eliminate the need for lifting the log and will save time and labor and result in more efficient operation.

Having thus fully described my invention what I claim as new and desire to secure by Letters Patent is:

1. A cant hook comprising a handle, a collar including a pair of spaced ears mounted on said handle and spaced from an end thereof, a hook pivotally connected to the ears of said collar, a pair of spaced parallel lugs secured to said collar, a brace arranged at right angles with respect to the handle and having one end interposed between said pair of lugs, means for securing said brace to said lugs, a cross arm arranged at right angles with respect to the other end of said brace and secured thereto, said cross arm having its ends extending beyond said brace for a substantial distance, a sleeve spaced from said collar mounted on an end of said handle, a pair of ears projecting from said sleeve, and a rocker having one end secured to the other end of said brace and its other end secured to the ears of said sleeve.

2. A cant hook comprising a handle, a collar including a pair of spaced ears mounted on said handle and spaced from an end thereof, a hook pivotally connected to the ears of said collar, a pair of spaced parallel lugs secured to said collar, a brace arranged at right angles with respect to the handle and having one end interposed between said pair of lugs, means for securing said brace to said lugs, a cross arm arranged at right angles with respect to the other end of said brace and secured thereto, said cross arm having its ends extending beyond said brace for a substantial distance, a sleeve spaced from said collar mounted on an end of said handle, a pair of ears projecting from said sleeve, a rocker having one end secured to the other end of said brace and its other end secured to the ears of said sleeve, and body members arranged at right angles with respect to said cross arm and extending between said cross arm and brace.

NORTON J. DAVIS.

REFERENCES CITED

The following references are of record in the file of this patent:

UNITED STATES PATENTS

| Number | Name | Date |
|---|---|---|
| 54,000 | McKinney | Apr. 17, 1866 |
| 64,106 | Huffman | Apr. 23, 1867 |
| 2,162,668 | Stocker | June 13, 1939 |
| 2,195,667 | Baker | Apr. 2, 1940 |